United States Patent [19]
Tabacek et al.

[11] 3,870,545
[45] Mar. 11, 1975

[54] PROCESS FOR COATING A CATALYST SUPPORT

[75] Inventors: Joseph A. Tabacek, New Kinsington; Brian W. Taylor, Richland Township; Roger F. Vogel, Jefferson Township, all of Pa.

[73] Assignee: Gulf Research & Development Company, Pittsburgh, Pa.

[22] Filed: July 23, 1973

[21] Appl. No.: 381,978

[52] U.S. Cl. ....... 117/71 R, 117/123 B, 117/169 R, 252/313 R
[51] Int. Cl. ............................ B01j 11/46, B44d 1/44
[58] Field of Search ........ 117/123 A, 123 B, 169 R, 117/54, 71, 88; 252/313 R

[56] References Cited
UNITED STATES PATENTS

| | | | |
|---|---|---|---|
| 2,069,486 | 2/1937 | Tilden | 117/123 |
| 2,085,129 | 6/1937 | Stoewener | 117/169 |
| 2,371,237 | 3/1945 | Heard et al. | 117/169 |
| 2,689,809 | 9/1954 | Fessler | 117/169 |
| 2,970,966 | 2/1961 | Hoekstra | 252/313 |
| 3,431,120 | 3/1969 | Weisenberger | 117/54 |
| 3,767,453 | 10/1973 | Hoekstra | 117/169 |

Primary Examiner—William D. Martin
Assistant Examiner—Sadie L. Childs

[57] ABSTRACT

A process for applying a high surface area coating to a catalyst support having a low surface area in which the catalyst support is coated with an alumina sol that has been treated with ammonia or an amine and then calcined.

24 Claims, No Drawings

PROCESS FOR COATING A CATALYST SUPPORT

This invention relates to a process for applying high surface area coatings to catalyst supports having a low surface area. Thereafter, when catalytic materials are subsequently applied, a more effective catalyst is obtained.

The catalyst support used herein can be made of any dense, heat-resistant material capable of maintaining an alumina coating thereon, such as glass, metal, fused alumina, silica or magnesia, sintered alumina, zirconia, chromia, titania, etc., of any size or shape. The composition and preparation of these supports, as well as others, are disclosed, for example, in U.S. Pat. No. 3,112,184 to Hollenbach. Preferred among these supports are thin-walled refractory ceramic structures composed, for example, generally of a magnesium aluminum silicate.

Among the many coatings that can be applied to the catalyst supports defined above is alumina. The alumina can be added to the catalyst support by coating the same with an alumina sol, drying and then calcining at high temperatures. The sol can be prepared by digesting aluminum metal with a solution of an aluminum salt, such as aluminum chloride, and water.

We have found that the surface area of the alumina coating can be appreciably increased by treating the alumina with ammonia or an organic amine. After the alumina coating, that has been treated with ammonia or an amine, has been applied to the catalyst support, the resultant coated support can then be coated with a suitable catalytic metal, such as ruthenium. If desired, the catalytic metal can be added to the alumina sol and the resulting alumina coating on the catalyst support will then carry the desired catalytic metal.

Ammonia or any organic amine can be used herein. By an "organic amine" we mean to include any compound defined by the following structural formulae:

and

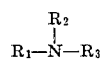

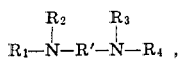

wherein $R_1$, $R_2$, $R_3$ and $R_4$, the same or different, can be hydrogen or alkyl, alkenyl, alknyl, cycloalkyl, cycloalkenyl, aryl or substituted derivatives thereof having from one to 20 carbon atoms, preferably from one to 10 carbon atoms, such as $CH_3-$, $C_2H_5-$, $C_3H_7-$, iso-$C_3H_7$, $C_4H_9-$, secondary-$C_4H_9-$, tertiary-$C_4H_9$, $C_5H_{11}$, cyclopentyl, cyclohexyl, $C_8H_{17}-$, $C_{10}H_{21}-$, $C_{15}H_{31}-$, $C_{19}H_{39}-$, $C_{20}H_{41}-$, 3-isopropylcyclohexyl, 3-phenylcyclopentyl, 2-phenylcyclohexyl, 2-methylcyclopentyl, phenyl, para-tolyl, benzyl, para-methylbenzyl, $CH_2=CH-CH_2-$, $CH_3-CH=CH-CH_2-$, $CH_2=CH-CH_2-CH_2-$, $CH\equiv C-CH_2-$, $CH\equiv C-CH_2-CH_2-$, HO-$CH_2-CH_2-$, Cl-$CH_2-CH_2-$, $CH_3-O-CH_2-CH_2-$, ortho-Cl-$C_6-H_4-$, para-Cl-$C_6H_4-$, meta-Cl-$C_6H_4-$, etc. In addition to the above amines, the following can also be used: compounds which contain a bridging nitrogen group, such as hexamethylenetetramine.

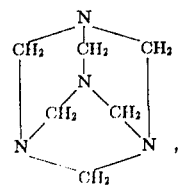

those that contain a basic nitrogen atom as part of aromatic ring, such as pyridine,

substituted pyridines, such as

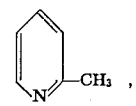

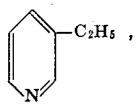

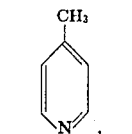

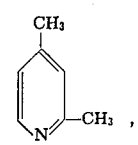

etc., compounds of the pyrrole,

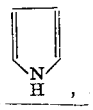

and pyrrolidine,

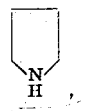

classes and their derivatives, etc. Among amines that can be used are methylamine, dimethylamine, trimethylamine, ethylamine, diethylamine, triethylamine, n-propylamine, di-n-propylamine, tri-n-propylamine, n-butylamine, n-amylamine, n-hexylamine, laurylamine, ethylenediamine, trimethylenediamine, tetramethylenediamine, pentamethylenediamine, hexamethylenediamine, ethanolamine, diethanolamine, triethanolamine, allylamine, aniline, methylaniline dimethylaniline, diethylaniline, o-toluidine, m-toluidine, p-toluidine, o-nitroaniline, m-nitroaniline, p-nitroaniline, 2,4-dinitroaniline, o-phenylenediamine, m-phenylenediamine, p-phenylenediamine, o-anisidine, p-anisidine, p-phenetidine, o-chloroaniline, m-chloroaniline, p-chloroaniline, p-bromoaniline, 2,4,6-trichloroaniline, 2,4,6-tribromoaniline, diphenylamine, triphenylamine, benzidine, o-tolidine and o-dianisidine.

The treatment of the alumina sol will be dictated by the choice of amine. In order to facilitate the application of the alumina sol to the catalyst support, the same must be done without causing premature gelling of the alumina sol. For example, if the amine is one that can be added to the alumina sol without premature formation of a gel, such as hexamethylenetetramine (HMT), then the amine is added to the alumina sol and the following procedure is employed. The coating mixture used in such case will contain the following materials in weight per cent:

|  | Weight % Broad Range | Weight % Narrow Range |
|---|---|---|
| Aluminum | 2.6 to 19 | 7.8 to 19 |
| Chlorine | 1.3 to 25 | 5.1 to 19 |
| Water | 36 to 95.7 | 51 to 85.6 |
| Amine | 0.4 to 20 | 1.5 to 11 |

The coating mixture is obtained in any suitable or convenient manner. Thus, an alumina sol is prepared by first dissolving aluminum chloride in water and aluminum metal is the added to the solution and the resulting mixture is permitted to set for a period, for example, of about 0.1 to about 24 hours to obtain reaction between the aluminum chloride and aluminum. Additional aluminum metal is then added to the resulting solution and the same is maintained at a temperature of about 70° to about 105° C. for about 12 to about 168 hours to obtain additional reaction between the aluminum chloride and the added aluminum. The alumina sol is then cooled to room temperature and HMT, which is usually in solution, is added thereto prior to its use as a coating. The amounts of water, aluminum, chlorine and HMT used in the above procedure are selected so that the resulting mixture will contain each of the same within the limits defined above. The exact chemical composition of the sol has not been definitely established, but it may be represented approximately by the formula: 4-½ Al(OH)$_3$·AlCl$_3$. However, it is understood that the present invention is not limited to this specific composition, and that this product also may be referred to as a solution, colloidal solution, etc. In any event, this product contains less combined chlorine than is present in aluminum chloride (AlCl$_3$) and is also readily soluble in water. The specific gravity of the sol prior to addition of HMT thereto is in the range of about 1.1 to about 1.5, preferably from about 1.3 to about 1.4, and the pH within a range of about 1.8 to about 7.0, preferably about 3.3 to about 3.8.

Alternatively, an alumina sol can be prepared using aluminum nitrate and aluminum metal. The coating mixture used in such case will contain the following materials in weight per cent:

|  | Weight % Broad Range | Weight % Narrow Range |
|---|---|---|
| Aluminum | 2.6 to 16 | 7.5 to 16 |
| Nitrate | 2.2 to 37 | 8.6 to 29 |
| Water | 30 to 94.8 | 45.4 to 82.4 |
| Amine | 0.4 to 17 | 1.5 to 9.6 |

The coating mixture is obtained in any suitable or convenient manner. Thus, an alumina sol is prepared by first dissolving aluminum nitrate in water and aluminum metal is then added to the solution and the resulting mixture is permitted to set for a period, for example, of about 0.1 to about 24 hours, to obtain reaction between the aluminum nitrate and aluminum. Additional aluminum metal is then added to the resulting mixture and the same is maintained at a temperature of about 50° to about 105° C. for about 12 to about 190 hours to obtain additional reaction between the aluminum nitrate and the added aluminum. Small amounts of nitric acid can be added periodically to aid the reaction. The alumina sol is then cooled to room temperature and HMT, which is usually in solution, is added thereto prior to its use as a coating. The amounts of water, aluminum, nitrate and HMT used in the above procedure are selected so that the resulting mixture will contain each of the same within the limits defined above.

The application of the coating composition of the catalyst base can be effected in any suitable manner. Thus, the base can be dipped into the coating solution or the same can be sprayed thereon. Thereafter, the coated base is calcined in air at atmospheric pressure and a temperature of about 260° to about 1,000° C., preferably about 480° to about 600° C., for about one to about 24, preferably about 5 to about 15 hours, preferably at atmospheric pressure.

In the event a liquid amine is used that will cause premature gelling of the alumina sol if the same is incorporated in the alumina sol, such as diethylamine, the catalyst support is first coated with the alumina sol, for example, by dipping the catalyst support therein, followed by coating, in the same manner, the coated catalyst support with the amine. These coatings can be applied, for example, at a temperature of about 0° to about 100° C. over a period of about 0.01 to about 3 hours. Calcination of the coated catalyst supports can be carried out as defined hereinabove.

If ammonia or a vaporous amine, such as methylamine, dimethylamine, trimethylamine or ethylamine is used to treat the sol and premature gelling takes place, the catalyst support can first be coated with an alumina sol, as described immediately above, and then a stream of ammonia or such amine can be directed thereon, for example, over a period of about 0.03 to about 3 hours. Even if the amine that causes premature gelling is not liquid, but can be vaporized in a stream of an inert gas, such as nitrogen, for example, diethylamine, the catalyst support can first be coated with the alumina sol and then a stream of inert gas carrying the vaporized amine can be directed thereon as defined above. Again, the treatment is followed by calcination as described.

In cases wherein the amine is not present in the sol when the catalyst support is coated therewith, the alumina sol can contain the following materials in weight per cent:

|  | Weight % Broad Range | Weight % Narrow Range |
|---|---|---|
| Aluminum | 2.6 to 19 | 7.8 to 19 |
| Chlorine | 1.3 to 25 | 5.1 to 19 |
| Water | 56 to 96.1 | 62 to 87.1 |

The sol is prepared as defined above.

The improved procedure defined herein can be further illustrated by the following.

EXAMPLE I

An alumina sol was prepared in the following manner. 241 grams of AlCl$_3$·6H$_2$O was dissolved in 600 milliliters of distilled water at room temperature and 60 grams of granular aluminum metal (Fisher A-57) was added thereto. The mixture was then permitted to set for about 16 hours, during which time reaction occurred between the aluminum chloride and aluminum metal, as evidenced by a temperature rise to about 45° C. The mixture was then placed on a hot plate and stirred rapidly using a magnetic stir bar. Heat was then applied to the mixture and while the mixture was maintained at a temperature in the range of about 90° to 95° C., 60 grams of granular aluminum metal (Fisher A-57) was added incrementally thereto over a period of 72 hours until all of the aluminum had reacted. The sol was then cooled to room temperature and diluted with distilled water to 800 milliliters. The finished product was yellowish in color and had a specific gravity of 1.359 grams per cubic centimeter and a pH of 3.5. In weight per cent, the product had 76.7 per cent water, 13.5 per cent aluminum and 9.8 per cent chlorine.

EXAMPLE II

An alumina sol was prepared in the following manner. 748.8 grams of $Al(NO_3)_3 \cdot 9H_2O$ was dissolved in 1,200 milliliters of distilled water at room temperature and 60 grams of granular aluminum metal were added thereto. The mixture was stirred slowly for about 16 hours, during which time reaction occurred between the aluminum nitrate and aluminum metal, as evidenced by a dark yellow color of the mixture. The mixture was then heated with rapid stirring. The temperature was maintained above 50° C. while aluminum metal and small amounts of nitric acid were periodically added. The remaining aluminum metal reacted over a period of 168 hours. The sol was cooled to room temperature and diluted to 2,400 milliliters. The product has a specific gravity of 1.293 grams per cubic centimeter and a pH of 3.6. In weight per cent the product contained 9.44 per cent aluminum.

EXAMPLE III

A ceramic monolith was dipped into the alumina sol of Example I for one hour with occasional agitation. The uncoated monolith, which is resistant to temperature as high as 1,205° C. and is composed of magnesium aluminum silicate, is a cylinder having a diameter of one inch and a length of one inch and weighed 4.0186 grams. The monolith is provided with a grid of longitudinal holes, with 15 grid openings per linear inch along the diameter length and a wall thickness between openings of 0.009 inch. The monolith was removed, drained thoroughly and then blown free of excess sol with high velocity air. After drying at 121° C. for a period of 18 hours, the coated monolith was raised to a temperature of 538° C. over a period of 6 hours and then calcined in air at the latter temperature and atmospheric pressure for 10 hours. The heated monolith weighed 4.3103 grams. The gain in weight, due to the $Al_2O_3$ formed thereon, amounted to 7.3 weight per cent based on the uncoated monolith. The monolith was dipped into the sol a second time. After drying and calcining as before, it was found that the coated monolith weight 4.4141 grams, which represented an additional gain of 5.7 weight per cent. The surface area of the uncoated monolith, using the method of Brunauer, Emmett and Teller, was negligible on the basis of square meters per gram. The method for measuring surface area is discussed by S. Brunauer, THE ADSORPTION OF GASES AND VAPORS, Vol. 1, Princeton University Press, 1943. Relative pressure points for the method were obtained from JACS, Vol. 73, page 373, 1951, by E. P. Barret and others. The Absorptomet instrument was manufactured by American Instrument Company, Inc., Silver Spring, Md. using the same method, it was found that the coated monolith had a surface area too low to be detected.

EXAMPLE IV

A 30 weight per cent solution of HMT was prepared by adding 30 grams of HMT to 70 grams of water. 70 milliliters of sol prepared in Example I was cooled in a refrigerator and thoroughly mixed with 50 milliliters of the HMT solution which was similarly cooled. In weight per cent the resulting solution contained 74.8 per cent water, 8.6 per cent aluminum, 6.2 per cent chlorine and 11 per cent HMT. Three pieces of the same monolith used in Example III were dipped in the solution for one hour, drained, dried and calcined as in Example III. This procedure was repeated once with a second monolith and twice with a third. The weight gains for the three pieces were 5.2, 9.2 and 12.4 weight per cent, respectively. Using the procedure of Brunauer, Emmett and Teller defined above, the surface areas were 6.9 square meters per gram, 16.1 square meters per gram and 32.4 square meters per gram. These data show the significant effect of the presence of HMT in the sol in increasing the surface area of the aluminum oxide coated ceramic monolith.

That the concentration of HMT in the sol is important in the extent of surface area obtained is apparent from the following examples:

EXAMPLE V

The same monolith used previously was soaked three times, each soaking lasting one hour, in a solution similar to that used in Example IV but wherein the components in weight per cent were present as follows: 76.6 per cent water, 13.3 per cent aluminum, 9.6 per cent chlorine and 0.5 per cent HMT. The monolith was dried and calcined after each soaking as in Example III. The gain in $Al_2O_3$ coating amounted to 16.9 weight per cent and the surface area 1.5 square meters per gram.

EXAMPLE VI

The run of Example V was repeated using the following mixture: 76.4 weight per cent water, 12.7 weight per cent Al, 9.1 weight per cent Cl and 1.8 weight per cent HMT. The weight gain was 20.2 weight per cent and the surface area 5.0 square meters per gram.

EXAMPLE VII

The run of Example V was repeated using the following mixture: 76.3 weight per cent water, 12.5 weight per cent Al, 9.0 weight per cent Cl and 2.2 weight per cent HMT. The weight gain was 24.3 weight per cent and the surface area 20.8 square meters per gram.

EXAMPLE VIII

The run of Example V was repeated using the following mixture: 76.0 weight per cent water, 12.1 weight per cent Al, 8.7 weight per cent Cl and 3.2 weight per cent HMT. The weight gain was 22.5 weight per cent and the surface area greater than 31 square meters per gram.

EXAMPLE IX

A monolith, as defined in Example III, was soaked for one hour at atmospheric pressure and temperature in the alumina sol prepared in Example I. The monolith was removed, drained thoroughly, blown free of excess sol with high velocity air and then dipped into pure liquid diethylamine for ten minutes. After drying in air, the resultant coated monolith was calcined at 538°C. and atmospheric pressure over a period of 10 hours. The entire procedure was repeated once. The product was found to have had a weight gain of 13.3 weight per cent and a surface area of 21.5 square meters per gram.

EXAMPLE X

The procedure of Example IX was repeated, except that a 30 weight per cent aqueous solution of diethylamine was used instead of pure diethylamine. The product had a weight gain of 9.82 weight per cent and surface area of 20.2 square meters per gram.

EXAMPLE XI

The defined monolith was coated with alumina sol as in Example IX. Then a stream of nitrogen gas, in an amount of about 100 cubic centimeters per minute, was bubbled through pure liquid diethylamine at a temperature of 25°C. and passed over the coated monolith for 1 hour. The monolith was dried and calcined as in Example IX. The entire procedure was repeated once. The product had a weight gain of 15.5 weight per cent and a surface area of 22.3 square meters per gram.

Example XII

The process of Example XI was repeated except that a stream of ammonia gas at a temperature of 25°C. in an amount of about 100 cubic centimeters per minute was passed over the coated monolith over a period of one-half hour. The monolith was dried and calcined. The entire procedure was repeated once. The product had a weight gain of 13.1 weight per cent and a surface area of 6.9 square meters per gram.

EXAMPLE XIII

A monolith, as defined in Example III, was soaked for one hour at atmospheric pressure and temperature in the sol prepared in Example I. The monolith was removed, drained thoroughly, blown free of excess sol with high velocity air and then dipped into pure liquid isopropylamine for 10 minutes. After drying in air, the resultant coated monolith was calcined at 538°C. and atmospheric pressure over a period of 10 hours. The product was found to have had a weight gain of 8.76 weight per cent and a surface area of 11.0 square meters per gram.

EXAMPLE XIV

The procedure of Example XIII was repeated, except that triethylamine was substituted for isopropylamine. The product had a weight gain of 8.54 weight per cent and a surface area of 14.3 square meters per gram.

EXAMPLE XV

The procedure of Example XIII was repeated, except that pyridine was substituted for isopropylamine. The product had a weight gain of 6.71 weight per cent and a surface area of 8.1 square meters per gram.

EXAMPLE XVI

The procedure of Example XIII was repeated, except that diethanolamine was substituted for isopropylamine. The product had a weight gain of 9.04 weight per cent and a surface area of 19.7 square meters per gram.

EXAMPLE XVII

In this Example it can be seen that the aluminum oxide coating obtained herein can be used to effectively carry a metal catalyst. The coated monolith of Example VIII was dipped for one hour into an aqueous solution of ruthenium chloride containing 0.004 gram of ruthenium per milliliter of solution. The coated monolith was drained thoroughly, after which $H_2S$ gas was passed thereover at atmospheric conditions for 30 minutes to precipitate ruthenium sulfide thereon. The treated monolith was then calcined in air at a temperature of 538°C. over a period of 10 hours. The resultant coated monolith had a surface area of 31.4 square meters per gram and contained 0.68 weight per cent ruthenium. In place of ruthenium metal salts, for example, the following metals can also be used: barium, cobalt, nickel, copper and platinum. The treated base will contain the corresponding metal as catalyst.

Generally speaking, any soluble metal salt which will not cause gelling of the sol can be dissolved in the sol and added simultaneously with the coating. Additional metals can be added subsequently to this coating. Salts which can be dissolved in the sol would include nearly all soluble chlorides and nitrates, for example. However, when anions which form weak acids are used, such as acetates, only cations forming weak bases, such as nickel, would be compatible with the sol. It should also be realized that various insoluble compounds can be added simultaneously with the sol. However, they must be finely divided in order to achieve good dispersion in the mixture. When it is desirable to add catalytic materials after the coating has been applied, then any soluble salts or combination of salts can be used. It is preferable, however, to fix the desired components on the support with a gas treatment which will inhibit the desired components from migrating on the surface of the support.

EXAMPLE XVIII

In this example it can be seen that salts can be dissolved into the alumina sol and added to the monolith simultaneously with the coating. Ruthenium trichloride and chloroplatinic acid were dissolved into the alumina sol described in Example I. The concentration of the ruthenium was 0.002 gram per milliliter and the concentration of the platinum was 0.004 gram per milliliter. The monolith was dipped for one hour into the mixture. The coated monolith was drained thoroughly, after which ammonia gas was passed thereover at atmospheric conditions for 30 minutes. The treated monolith was dried at 120°C. and calcined for ten hours at 538°C. The entire process was repeated. The resultant coated monolith had a weight gain of 15.8 weight per cent, a surface area of 16.8 square meters per gram and contained 0.14 weight per cent platinum and 0.07 weight per cent ruthenium.

EXAMPLE XIX

Alumina sol as prepared in Example I was saturated with a barium chloride salt by adding 24.26 grams of $BaCl_2 \cdot 2H_2O$ to 93.32 grams of sol. A ceramic monolith was dipped into the mixture for one hour. The coated monolith was drained thoroughly, after which ammonia gas was passed thereover at atmospheric conditions for 30 minutes. The treated monolith was dried at 120° C. and calcined for 10 hours at 538° C. The entire process was repeated. Next the coated monolith was dipped for one hour into an aqueous solution of ruthenium chloride and chloroplatinic acid containing 0.014 gram of ruthenium per milliliter and 0.017 gram of platinum per milliliter. The monolith was drained thoroughly, after which ammonia gas was passed thereover for 30 minutes. The catalyst was then reduced in hydrogen for four hours at 538° C. and atmospheric conditions. Finally, the catalyst was calcined for ten hours at 1,000° C. The product had a weight gain of 26.6 weight per cent, a surface area of 11.5 square meters per gram and contained 3.5 weight per cent barium, 0.20 weight per cent ruthenium and 0.27 weight per cent platinum.

EXAMPLE XX

This Example demonstrates that a fine powder can be suspended in the alumina sol and then added to a monolith. 9.31 grams of a composition containing barium, ruthenium, platinum and oxygen was ground and passed through a 230-mesh screen. It was dispersed with stirring into 194.01 grams of alumina sol prepared as in Example I. A monolith was dipped into the mixture with agitation for 5 minutes. The coated monolith was drained thoroughly, after which ammonia gas was passed thereover at atmospheric conditions for 30 minutes. The treated monolith was dried at 120° C. and calcined for 10 hours at 538° C. The entire process was repeated. The resultant coated monolith had a weight gain of 16.6 weight per cent, a surface area of 11.4 square meters per gram and contained 0.56 weight per cent barium, 0.22 weight per cent ruthenium and 0.06 weight per cent platinum.

The catalysts so obtained can be used for many purposes, for example, to convert nitrogen oxides in an automobile exhaust gas to nitrogen.

Obviously, many modifications and variations of the invention, as hereinabove set forth, can be made without departing from the spirit and scope thereof and, therefore, only such limitations should be imposed as are indicated in the appended claims.

We claim:

1. A process for applying a high surface area coating to catalyst supports having a low surface area which comprises coating said support with an alumina sol mixture consisting essentially of about 2.6 to about 19 per cent by weight of aluminum, about 1.3 to about 25 per cent by weight of chlorine, about 36 to about 95.7 per cent by weight of water and about 0.4 to about 20 per cent by weight of an amine or consisting essentially of about 2.6 to about 16 per cent by weight of aluminum, about 2.2 to about 37 per cent by weight of nitrate, about 30 to about 94.8 per cent by weight of water and about 0.4 to about 17 per cent by weight of an amine and then calcining said coated support.

2. The process of claim 1 wherein said amine is hexamethylenetetramine.

3. The process of claim 1 wherein said mixture is obtained by heating aluminum metal in an aqueous solution of an aluminum salt and thereafter adding hexamethylenetetramine to the resulting sol.

4. The process of claim 3 wherein said aluminum salt is $AlCl_3$.

5. The process of claim 3 wherein said aluminum salt is $Al(NO_3)_3$.

6. The process of claim 1 wherein said sol additionally contains at least one metal compound.

7. The process of claim 6 wherein said metal compound is a ruthenium compound.

8. The process of claim 6 wherein said metal compound is a platinum compound.

9. The process of claim 6 wherein said metal compound is a barium compound.

10. The process of claim 1 wherein said calcination is effected at a temperature of about 260° to about 1,000° C.

11. The process of claim 1 wherein said catalyst support is a ceramic support.

12. The process of claim 11 wherein said support is composed of a magnesium aluminum silicate.

13. The process of claim 1 wherein the calcined support is further coated with a metal compound and the treated support is subjected to additional calcination.

14. The process of claim 13 wherein said metal compound is a ruthenium compound.

15. A process for applying a high surface area coating to catalyst supports having a low surface area which comprises coating said support with an alumina sol mixture consisting of about 2.6 to about 19 per cent by weight of aluminum, about 1.3 to about 25 per cent by weight of chlorine and about 56 to about 96.1 per cent by weight of water, further coating with ammonia or an amine in an amount to increase significantly the surface area of said support and then calcining the coated support.

16. The process of claim 15 wherein said amine is diethylamine.

17. The process of claim 15 wherein said amine is isopropylamine.

18. The process of claim 15 wherein said amine is triethylamine.

19. The process of claim 15 wherein said amine is pyridine.

20. The process of claim 15 wherein said amine is diethanolamine.

21. The process of claim 15 wherein the catalyst support is coated with said alumina sol and then such coated support is contacted with a gaseous amine prior to calcination.

22. The process of claim 15 wherein the catalyst support is coated with said alumina sol and then such coated support is contacted with ammonia prior to calcination.

23. The process of claim 15 wherein the catalyst support is coated with said alumina sol and then such coated support is contacted with an inert gas carrying an amine prior to calcination.

24. The process of claim 23 in which said amine is diethylamine.

* * * * *